(12) United States Patent
Taylor et al.

(10) Patent No.: US 7,773,710 B2
(45) Date of Patent: Aug. 10, 2010

(54) METHOD AND SYSTEM FOR DATA RECEPTION WITH DECREASED BIT ERROR RATE

(75) Inventors: Richard Duane Taylor, Moneta, VA (US); William Oscar Janky, Goode, VA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 733 days.

(21) Appl. No.: 11/726,327

(22) Filed: Mar. 20, 2007

(65) Prior Publication Data

US 2008/0232649 A1    Sep. 25, 2008

(51) Int. Cl.
  *H04L 7/00*   (2006.01)
(52) U.S. Cl. .................................................. 375/355
(58) Field of Classification Search .................. 375/355
  See application file for complete search history.

(56) References Cited

U.S. PATENT DOCUMENTS

| 6,058,150 A * | 5/2000 | Ghosh | 375/365 |
| 2007/0064848 A1 * | 3/2007 | Desai | 375/355 |

* cited by examiner

*Primary Examiner*—Kevin Y Kim
(74) *Attorney, Agent, or Firm*—Fox Rothschild, LLP; Robert J. Sacco

(57) ABSTRACT

A method and system is provided for improving bit error rate (BER) performance in delay spread fading conditions, such as the fading associated with simulcast systems. BER is improved through novel symbol synchronization that comprises oversampling an input signal and filtering the samples to determine a composite symbol sample point that converges toward the center of the signal's effective eye pattern. The composite symbol sample point may be an average of previous composite symbol sample points and an instantaneous sample point determined based on samples from a synchronization field of the signal. The updated composite symbol sample point may be utilized for future sampling of the incoming signal.

18 Claims, 11 Drawing Sheets

METHOD AND SYSTEM FOR DATA RECEPTION WITH DECREASED BIT ERROR RATE

FIELD OF THE INVENTION

The invention relates generally to systems and methods for simulcast data reception, and more particularly to systems and methods for simulcast data reception with decreased bit error rate.

BACKGROUND OF THE INVENTION

Radio communication systems are used in many different applications. For example, law enforcement and emergency personnel frequently use radio systems to communicate with each other. In some applications, simulcast radio communication systems are used to communicate with a number of fixed or mobile radios, or "terminals," spaced over a large geographic area. Simulcast communication systems operate by transmitting from multiple site locations, or "sites." Each site has one or more base stations that transmit a signal to communicate with the terminals. In a simulcast system, communication signals typically are transmitted at about the same time by all sites in the system. The communications may be received by a variety of different types of terminals, including handheld radios, vehicular radios, etc. A given radio will receive communications from the system as long as the radio is within the transmission range of at least one of the multiple simulcast sites.

In some situations, a radio may experience interference if it is within the transmission range of more than one simulcast site. For example, if a terminal is within range of two simulcast sites, it will receive the same communication signal from both sites—but not necessarily at the same time. This typically occurs if the terminal is closer to one site that it is to the other site. In this case, because of the different transmission distances, there will be a slight delay in receiving the signal from the further site (relative to receipt of the same signal from the nearer site). As a result of this delay, the signals received from the two sites may interfere with one another. This interference is a form of "delay spread fading."

High delay spreads in a simulcast system can result in significant signal degradation, with the degree of degradation influenced by the type of modulation that is used. For digital modulations, a metric for quantifying delay spread degradation is the bit error rate (BER).

One type of modulation is defined by the Project 25 (P25) standard for public safety radio communications. Project 25 is defined by a suite of American National Standards and other documents developed by the Telecommunications Industry Association (TIA). The P25 Phase 1 specification includes two alternative digital modulation schemes, C4FM and CQPSK. C4FM is a constant-envelope, four-level frequency modulation scheme that operates in 12.5 kHz channels. CQPSK is a compatible differential four-level quadrature phase shift keying modulation scheme, which, when designed in accordance with P25 specification design parameters, requires less bandwidth than C4FM. Both C4FM and CQPSK as defined in the P25 specification provide a symbol transmission rate of 4800 baud using two bits per symbol. The resulting total channel throughput is 9600 bits per second (bps).

The amount of delay spread degradation in a simulcast system is influenced by the duration of the delay relative to the symbol transmission period. The C4FM and CQPSK modulation schemes used in P25-compatible systems transmit one symbol every 208.33 microseconds. When the delay spread in these systems is less than 20 microseconds, the resulting bit error rate for strong signals typically is less than 1%. As the delay spread increases, however, the bit error rate also increases. For example, a delay spread of 60 microseconds results in a strong-signal bit error rate of over 5%, which is enough to substantially degrade communication quality. With higher delay spreads, the degradation in communication quality becomes even worse.

Simulcast systems typically are designed to minimize delay spread. To a certain extent, system designers are able to reduce delay spread by adjusting site placement, antenna/tower parameters, and signal transmission timing. As a practical matter, however, it is extremely difficult if not impossible to entirely eliminate delay spread, and relatively high delay spreads (i.e., 100 microseconds or more) are not uncommon.

Previous attempts to reduce bit error rates under delay spread conditions have used synchronization data within an incoming data frame to select an instantaneous symbol sample point. The selected symbol sample point is then used to sample each of the symbols in that frame. The process is then repeated for the next data frame, using the synchronization data from the next data frame to select a new instantaneous symbol sample point and then using the new symbol sample point to sample each of the symbols in that frame. Systems employing this approach have selected a new instantaneous symbol sample point for each frame based solely on the synchronization data for that frame. So long as the delay spread stays fairly constant from frame to frame, these previous techniques perform acceptably. However, typical delay spread fading varies rapidly—even within a single frame. As a result, the previous methods of relying exclusively on the synchronization data for the current frame are only valid at the instant the symbol sample point is selected. As subsequent symbols within the frame are sampled, the selected symbol sample point may become increasingly invalid, particularly if the instantaneous symbol sample point was determined during a momentary extreme delay spread. This results in a low bit error rate during the synchronization portion of the frame, but generally increasing bit error rates for the remainder of the frame.

Accordingly, there is a need for improved systems and methods that provide for simulcast transmission and reception with reduced bit error rates. There also is a need for systems and methods with reduced bit error rates that are compatible with existing simulcast systems, such as P25-compatible systems.

BRIEF SUMMARY

According to one aspect of the invention, there is a method for processing a signal with an effective eye pattern. A portion of the incoming signal is oversampled to generate a plurality of signal samples. An instantaneous sample point within a symbol period is determined based on at least one of the signal samples. An updated composite symbol sample point is determined based on a previous composite symbol sample point and the instantaneous sample point such that the updated composite symbol sample point converges toward the center of the effective eye pattern.

According to another aspect of the invention, there is a system for processing a signal having an effective eye pattern. The system includes a receiver configured to receive the signal. A processor is configured to oversample a portion of the received signal to generate a plurality of signal samples. The processor is further configured to determine an instantaneous sample point within a symbol period based on at least one of the plurality of signal samples. The processor also is configured to determine an updated composite symbol sample point based on a previous composite symbol sample point and the instantaneous sample point, such that the updated composite symbol sample point converges toward the center of the effective eye pattern.

According to another aspect of the invention, there is a system for processing a signal having an effective eye pattern. A transmitter is configured to transmit a signal containing synchronization field data, including a plurality of symbols with known values. A receiver is configured to receive the signal using a current composite symbol sample point. A sample point updater is configured to determine an updated composite symbol sample point based at least in part on the synchronization field data, such that the updated composite sample point converges toward the center of the effective eye pattern.

Other methods, apparatus, systems, features, and advantages of the invention will be, or will become, apparent to one with skill in the art upon examination of the following figures and detailed description. It is intended that all such additional systems, methods, features and advantages be included within this description.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PRESENTLY PREFERRED EMBODIMENTS

Embodiments of the invention include systems and methods for processing electromagnetic waves and signals, including transmitters, receivers, digital signal processors, modulators, filters, methods of transmission, modulation schemes, etc. The embodiments described in this application may be implemented in a wide range of applications, such as, for example, simulcast communication systems and methods. The invention also may be implemented in non-simulcast communication systems and methods to decrease bit error rates resulting from, for example, multi-path delay spread fading.

In many communication systems, data is communicated in the form of symbols, with each symbol representing one or more bits of information. For example, a four-level modulation scheme uses four symbols, with each symbol encoded with two bits of information. In radio frequency (RF) communication systems, symbols are modulated and transmitted on a carrier wave. The symbols are transmitted at a certain rate (the symbol transmission rate), which may be measured in hertz (Hz) or baud (Bd). The amount of time used to transmit a single symbol is known as the symbol period, which is the inverse of the symbol transmission rate.

Figure 1:
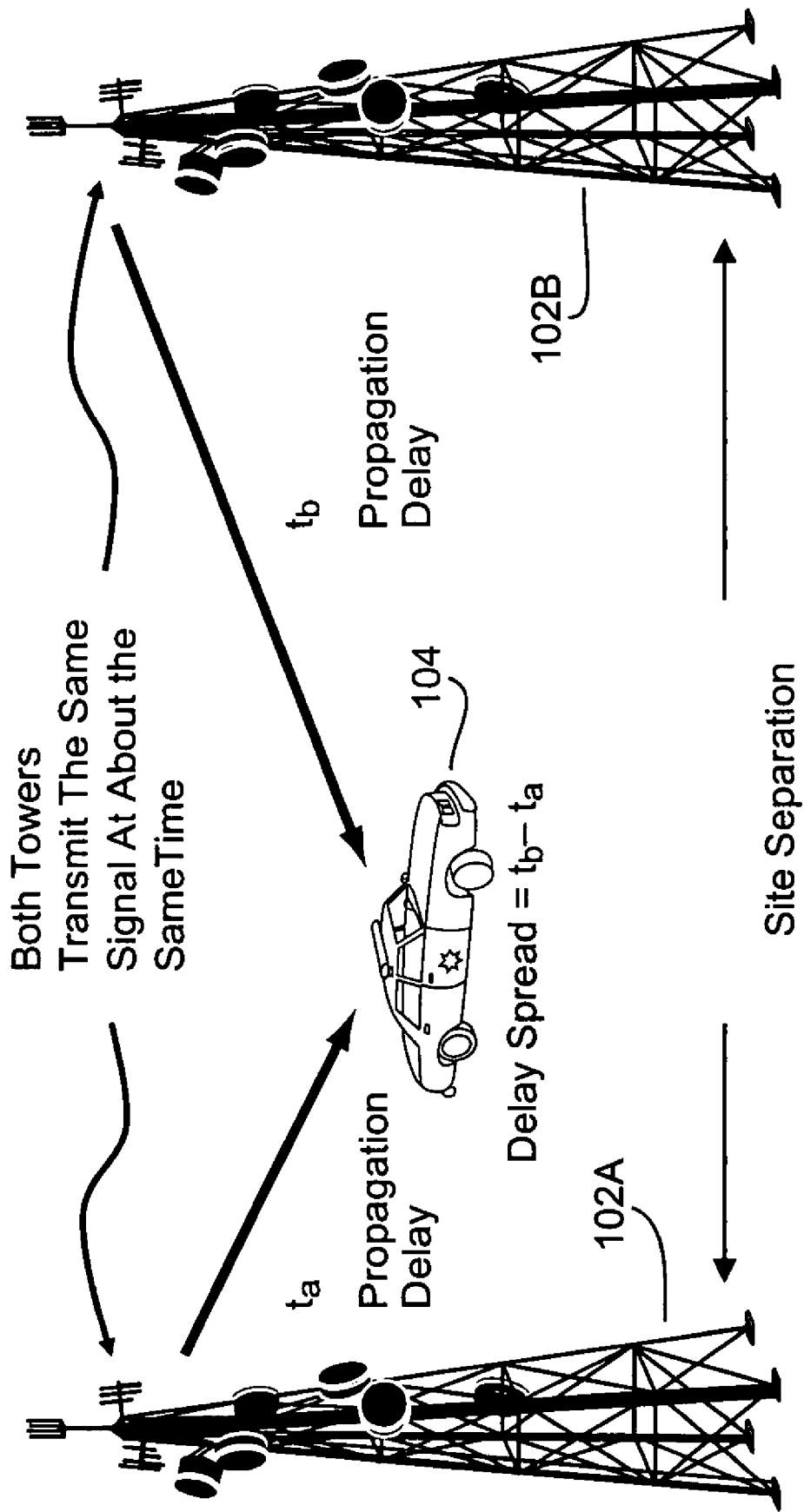
FIG. 1 is a diagram illustrating a simple simulcast transmission environment according to one aspect of the invention.

FIG. 1 is a diagram illustrating a simple exemplary simulcast transmission environment according to one aspect of the invention. The environment includes two sites 102A, 102B, and a single terminal 104 (e.g., the communication radio in a law enforcement vehicle). In typical simulcast systems, the sites are separated by three miles or more. Also, typical simulcast systems will often have more than the two transmitter sites that are shown in this simple figure.

As illustrated in FIG. 1, both sites 102A, 102B transmit the same signal at about the same time. The terminal 104 receives the signal from both sites 102A, 102B, but generally at different times. Based on the distance between the first site 102A and the terminal 104, the propagation delay of the signal from the first site 102A is $t_a$. Similarly, based on the distance between the second site 102B and the terminal 104, the propagation delay of the signal from the second site 102B is $t_b$. Because the first site 102A is closer than the second site 102B to the terminal 104, the signal from the first site 102A arrives at the terminal 104 first. The delay before receipt of the same signal from the second site 102B is defined as the delay spread, $|t_b - t_a|$.

Delay spread can change over time. For example, if the terminal 104 moves closer to the second site 102B, and farther away from the first site 102A, $t_b$ decreases and $t_a$ increases. Therefore, the delay spread $|t_b - t_a|$ decreases. Conversely, if the terminal 104 moves closer to the first site 102A, and farther away from the second site 102B, $t_a$ decreases and $t_b$ increases. Therefore, the delay spread $|t_b - t_a|$ increases. Furthermore, the rate of change of the delay spread may be dependent on the rate of travel of the terminal 104.

Figure 1A:
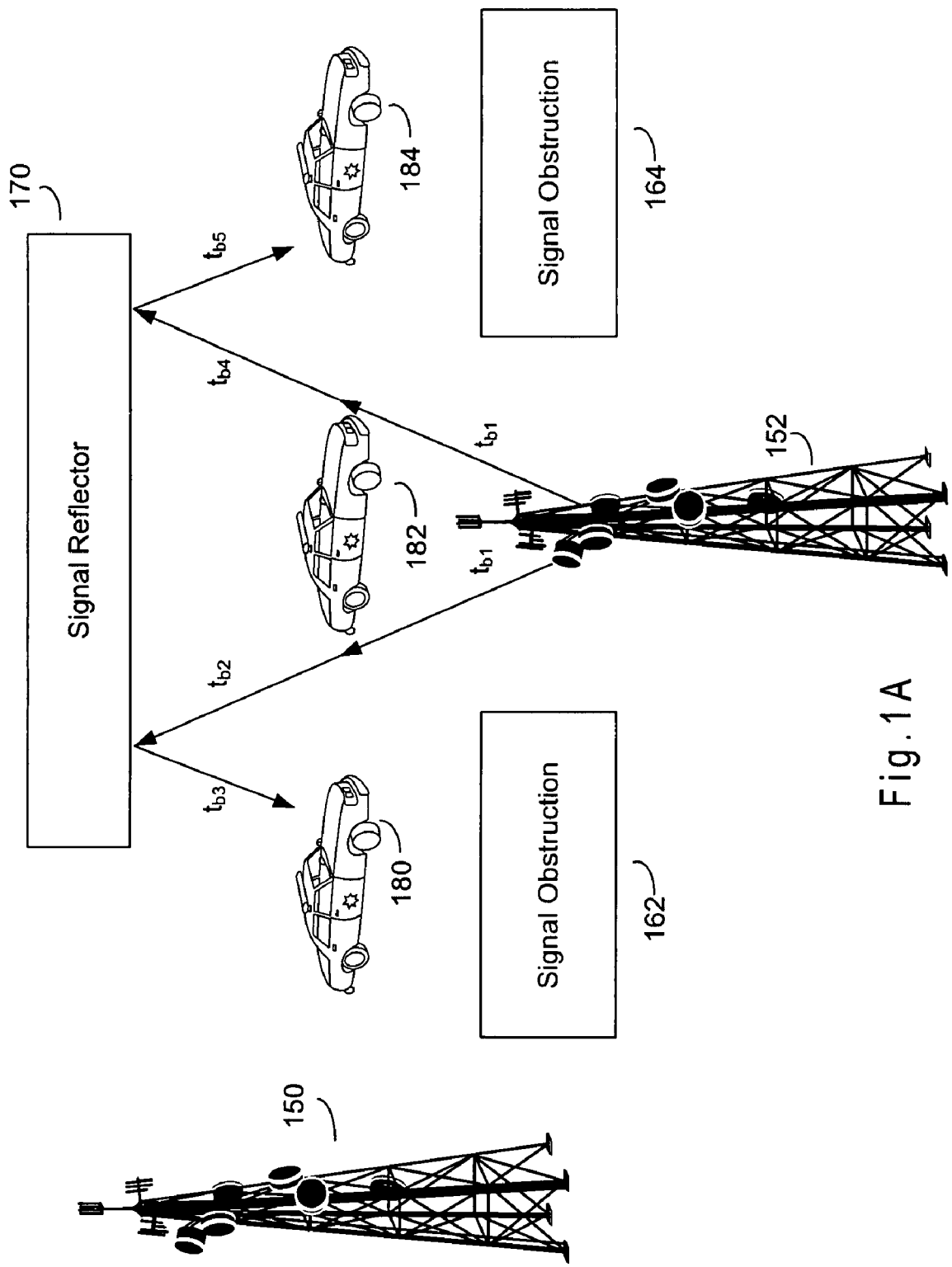
FIG. 1A is a diagram illustrating a simple simulcast transmission environment with signal reflectors and signal obstructions, according to one aspect of the invention.

Signal reflections may also cause changes in delay spread. FIG. 1A is a diagram illustrating another exemplary simulcast transmission environment according to one aspect of the invention. The environment includes two sites 150 and 152, two signal obstructions 162, 164, a signal reflector 170, and terminals 180, 182, 184 (e.g., the communication radios in a law enforcement vehicle). The propagation delay between first site 150 and terminals 180, 182, 184 will generally be a function of line-of-sight distance. However, transmitted signals from site 152 may be blocked by signal obstructions 160 and 162, and reflected by the signal reflector 170. The signal obstructions 160, 162, and the signal reflector 170 may be man-made objects such as buildings, or natural objects such as mountains. Additionally, the signal obstructions 160, 162, and the signal reflector 170 may be stationary objects or moving objects.

The signal obstruction 162 may block the direct transmission path from the second site 152 to the terminal 180, and the signal obstruction 164 may block the direct transmission path from the second site to 152 to the terminal 184. Transmissions from the second site 152 may bounce off the signal reflector 170 and may be received by the terminals 180 and 184. The propagation delay for transmissions between the second site 152 and the terminal 180 is $(t_{b1}+t_{b2}+t_{b3})$. Because there are no obstructions, the propagation delay for transmissions between the second site 152 and the terminal 182 is approximately $t_{b1}$. The propagation delay for transmissions between the second site 152 and the terminal 184 is $(t_{b1}+t_{b4}+t_{b5})$.

If a terminal moves from the position of the first terminal 180, through the position of the second terminal 182, and then to the position of the third terminal 184, the propagation delay for a signal from second site 152 changes from $(t_{b1}+t_{b2}+t_{b3})$ to $t_{b1}$ to $(t_{b1}+t_{b4}+t_{b5})$. Therefore, relatively instantaneous changes in propagation delay, and hence delay spread, can result as the transmission path between a transmission site and the terminal change as a result of signal obstructions and signal reflectors.

In analyzing the effect of delay spread, it is helpful to consider the "eye pattern" created by signal over a series of symbol periods. The eye pattern of a signal is the result of superimposing the signal pattern over a series of symbol periods. Delay spread tends to narrow the eye pattern of a signal, resulting an a smaller "effective eye pattern."

Figure 2:
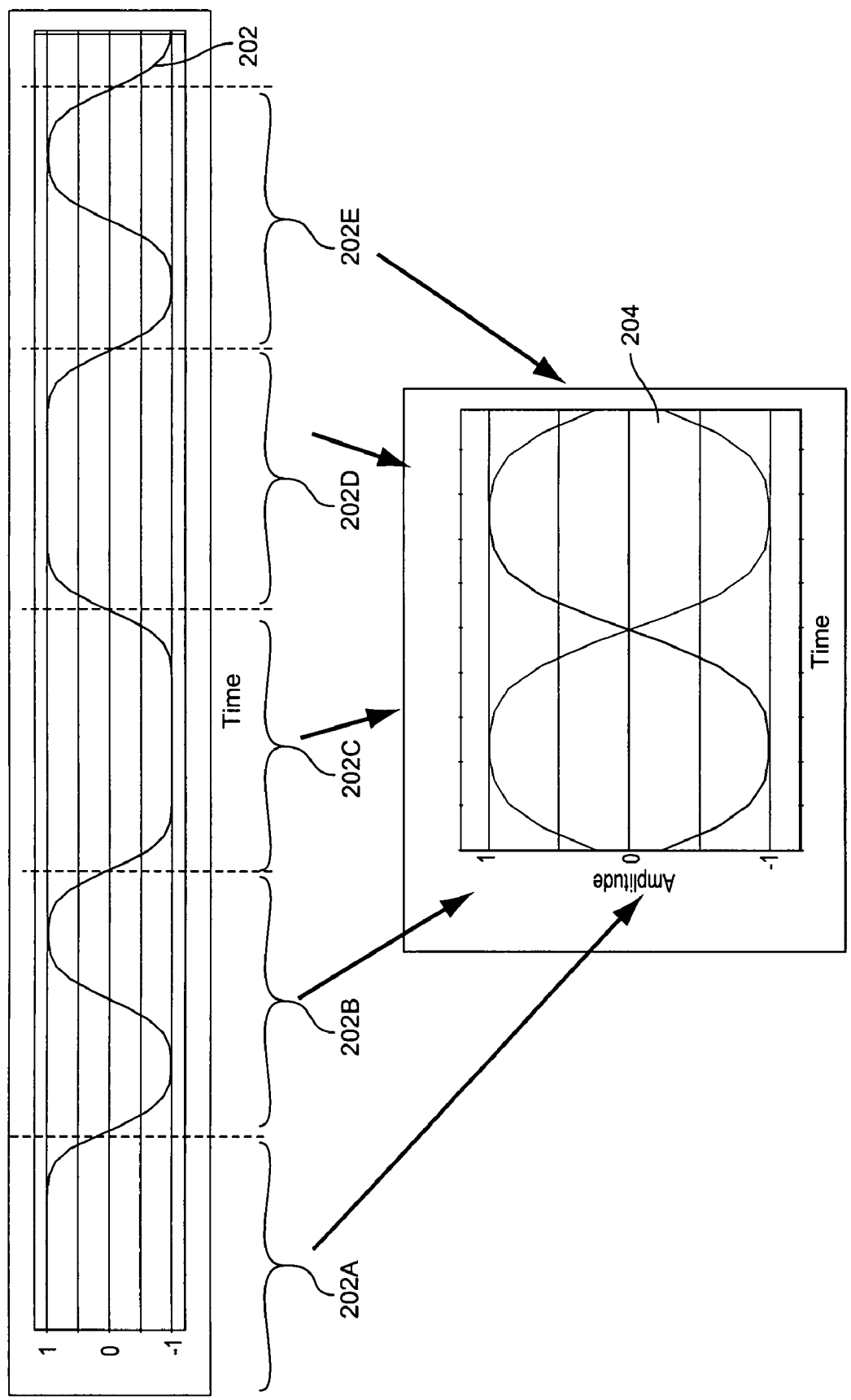
FIG. 2 is a time diagram illustrating the eye pattern of a simple signal over multiple symbol periods according to another aspect of the invention.

FIG. 2 is a time diagram illustrating the eye pattern of a simple two level signal 202 over five symbol periods 202A-E. As shown in FIG. 2, the signal pattern over a series of symbol periods 202A-E may be superimposed to show the pattern 204 of the signal 202 over many symbol periods 202A-E. This pattern 204 is referred to as the "eye pattern" because of its resemblance to open eyes. The eye pattern 204 illustrated in FIG. 2 is shown in two symbol periods, but similar eye patterns may be observed by superimposing portions of a signal over a longer or shorter time period (e.g., any integer multiple of the symbol period).

The eye pattern of a signal over time is significant because an "open" eye pattern reduces the ambiguity of the data symbols modulated on the carrier frequency. In effect, an open eye pattern may make it easier to detect the correct symbol in a given symbol period by allowing a larger time interval in which to sample the symbol. This reduces errors in data recovery based on the received signal. In other words, an open eye pattern may contribute to a lower bit error rate.

Figure 3:
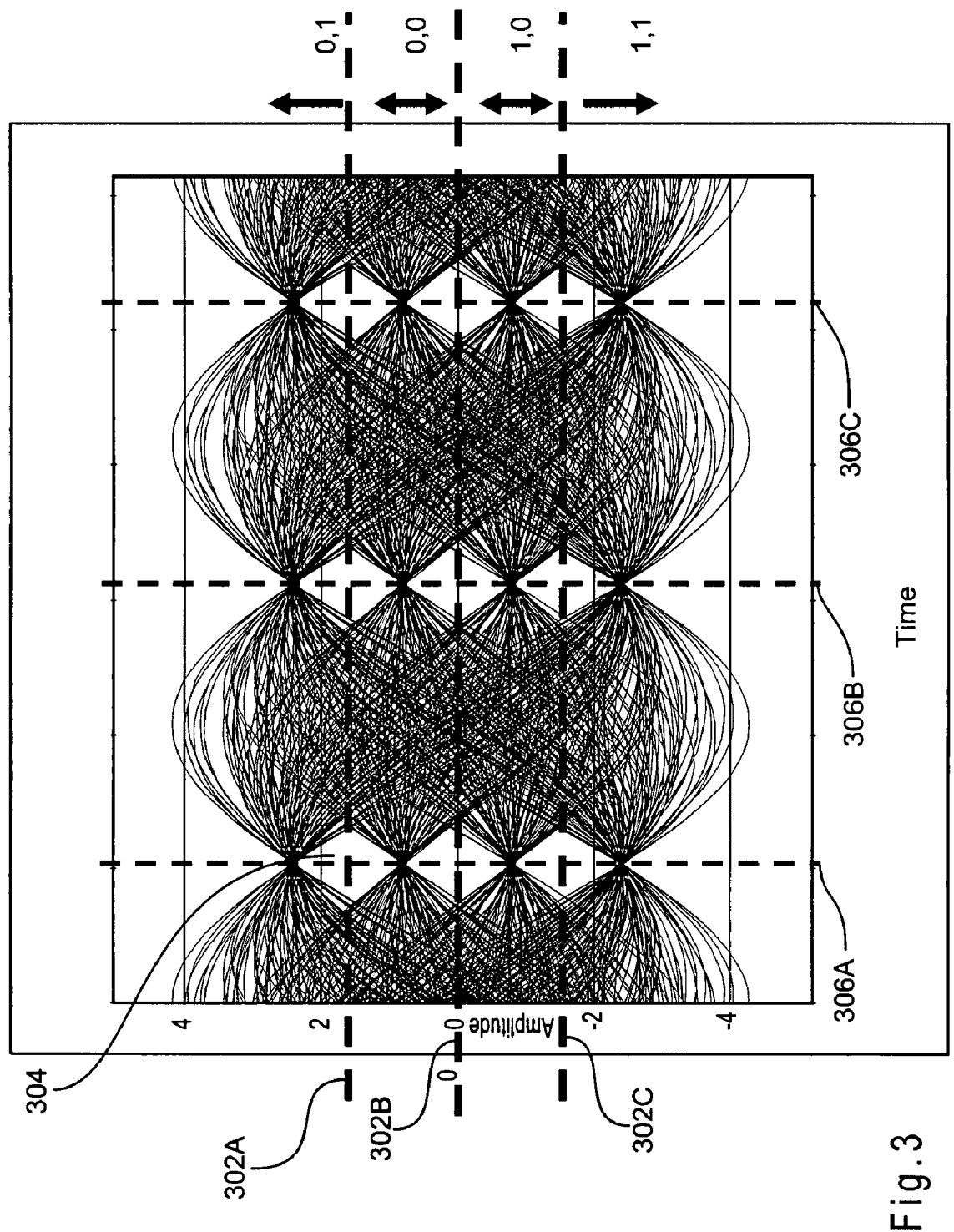
FIG. 3 is a time diagram illustrating the eye pattern of a four-level P25-compliant C4FM signal according to another aspect of the invention.

FIG. 3 is a time diagram illustrating the eye pattern of a four-level signal. Three thresholds 302A-C are used to separate the four possible symbol values. A sampled signal value greater than threshold 302A is interpreted as the symbol +3 which represents bits "0,1"; a value between the thresholds 302B and 302A is interpreted as the symbol +1 which represents bits "0,0"; a value between the thresholds 302C and 302B is interpreted as the symbol −1 which represents "1,0"; and a value less than the threshold 302C is interpreted as the symbol −3 which represents "1,1". The ideal sample points 306A-C for sensing the correct symbols are generally in the middle of the open eye patterns (e.g., eye pattern 304). For purposes of this application, "sample point" and "symbol sample point" are used interchangeably.

Figure 4:
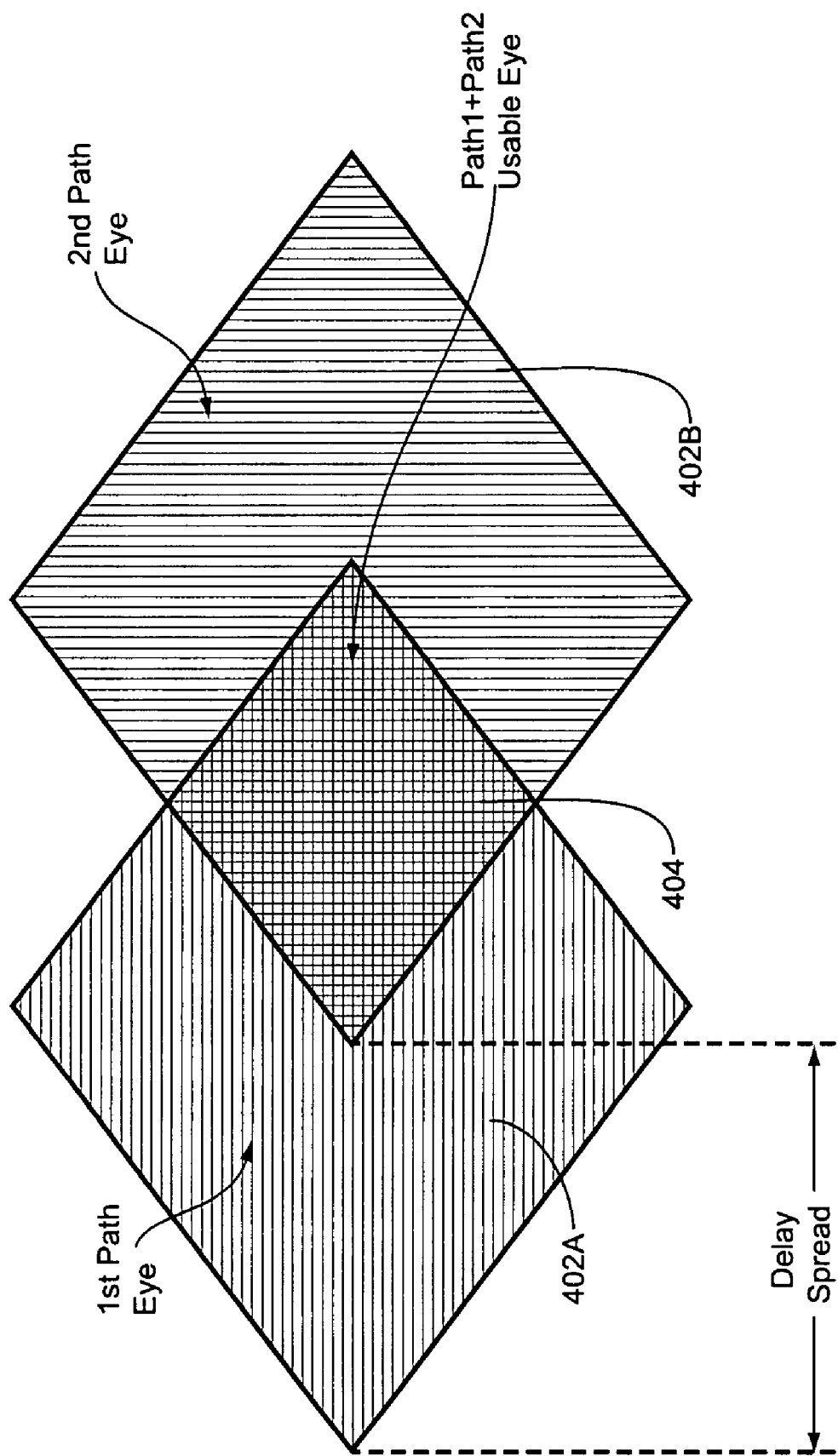
FIG. 4 is a time diagram illustrating the effect of delay spread on the eye pattern of a signal according to another aspect of the invention.

The interference effect of delay spread is illustrated in FIG. 4. This figure is a time diagram showing two versions 402A, 402B of the same signal received at different times over different paths (e.g., from different sites). The two signal versions 402A, 402B are transmitted and received on the same carrier frequency, so they may interfere with one another. By themselves, both versions 402A, 402B of the signal have large open eye patterns. However, when the two signal versions 402A, 402B partially overlap as a result of delay spread, the size of the resulting effective eye pattern 404 is reduced. The effective eye pattern 404 increases in size as the delay spread decreases. Conversely, as the delay spread increases, the effective eye pattern 404 is decreased in size, and the importance of selecting an appropriate sample point (i.e., within the eye pattern) increases.

In addition to the path delay of the received signals, other signal transmission effects can affect delay spread. For example, phase jitter and/or period jitter (also known as cycle-to-cycle jitter) may shift or otherwise affect one or both of the two signal versions 402A, 402B in time, causing the size of the effective eye pattern 404 or location of the effective eye pattern 404 within a signal period to vary over time.

In another example, referring back to FIG. 1, if the terminal 104 moves closer to the second site 102B, and farther away from the first site 102A, $t_b$ decreases and $t_a$ increases. Conversely, if the terminal 104 moves closer to the first site 102A, and farther away from the second site 102B, $t_a$ decreases and $t_b$ increases. Returning to FIG. 4, changes in $t_b$ and $t_a$ will shift the two signal versions 402A, 402B as a function of time, hence changing the size and/or location of the effective eye pattern 404 within a signal period.

The size and location of the effective eye pattern are important because the eye pattern roughly represents the portion of the symbol period during which the signal may be sampled accurately. For a sample of the signal to accurately represent a given symbol, the sample should be selected within the effective eye pattern of the symbol period. For best results, it may be desirable to select a sample from the center of the effective open eye pattern because the signal at the center of the effective eye pattern typically provides the most accurate representation of the transmitted symbol value.

Figure 5:
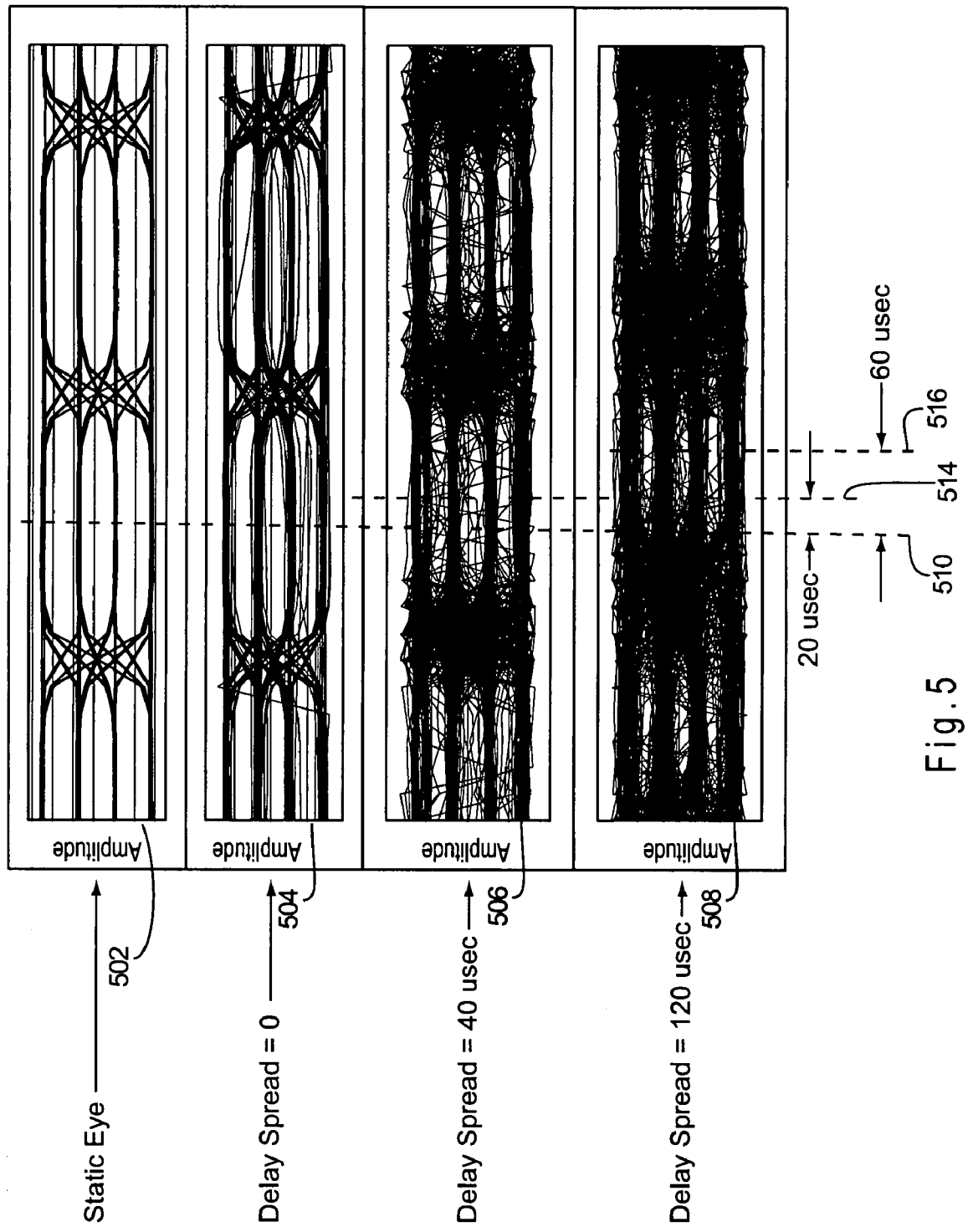
FIG. 5 is a time diagram illustrating four signals with varying delay spreads according to another aspect of the invention.

This concept is demonstrated in FIG. 5, which illustrates four signals with different delay spreads and different effective eye patterns. The first signal 502 represents a static eye pattern. This signal 502 includes a wide eye pattern that occupies almost the entire symbol period. The second signal 504, with zero delay spread, also has a very wide effective eye pattern. The third signal 506 has a delay spread of 40 microseconds. As shown in FIG. 5, the delay spread is narrowing the effective eye pattern for this signal 506. The fourth signal 508 has an even longer delay spread of 120 microseconds. With that large of a delay spread, the effective eye pattern is significantly narrowed, which presents a challenge in selecting an accurate sample of the signal within a given symbol period.

For the first and second signals 502, 504, almost any sample taken within a symbol period will accurately represent the symbol because there is no delay spread to narrow the effective eye pattern. For the third signal 506, the 40-microsecond delay spread narrows the effective eye pattern and reduces the range of samples that will accurately represent the symbol. In addition, the delay spread shifts the center 514 of the effective eye pattern by 20 microseconds from the original center 510. For the fourth signal 508, the 120-microsecond delay spread narrows the effective eye pattern even further, such that it occupies only a fraction of the entire symbol period. It also shifts the center 516 of the effective eye pattern even further—by 60 microseconds from the original center 510. One way to ensure selection of an optimal sample within the symbol period for each of these signals is to select a sample at or near the center of the effective eye pattern. Selection of a sample at or near the center of the effective eye pattern maximizes the chance of selecting a sample that is representative of the transmitted symbol. For that reason, it is desirable to use a sample selection algorithm that converges to the center of the effective eye pattern as the delay spread changes.

Figure 6:
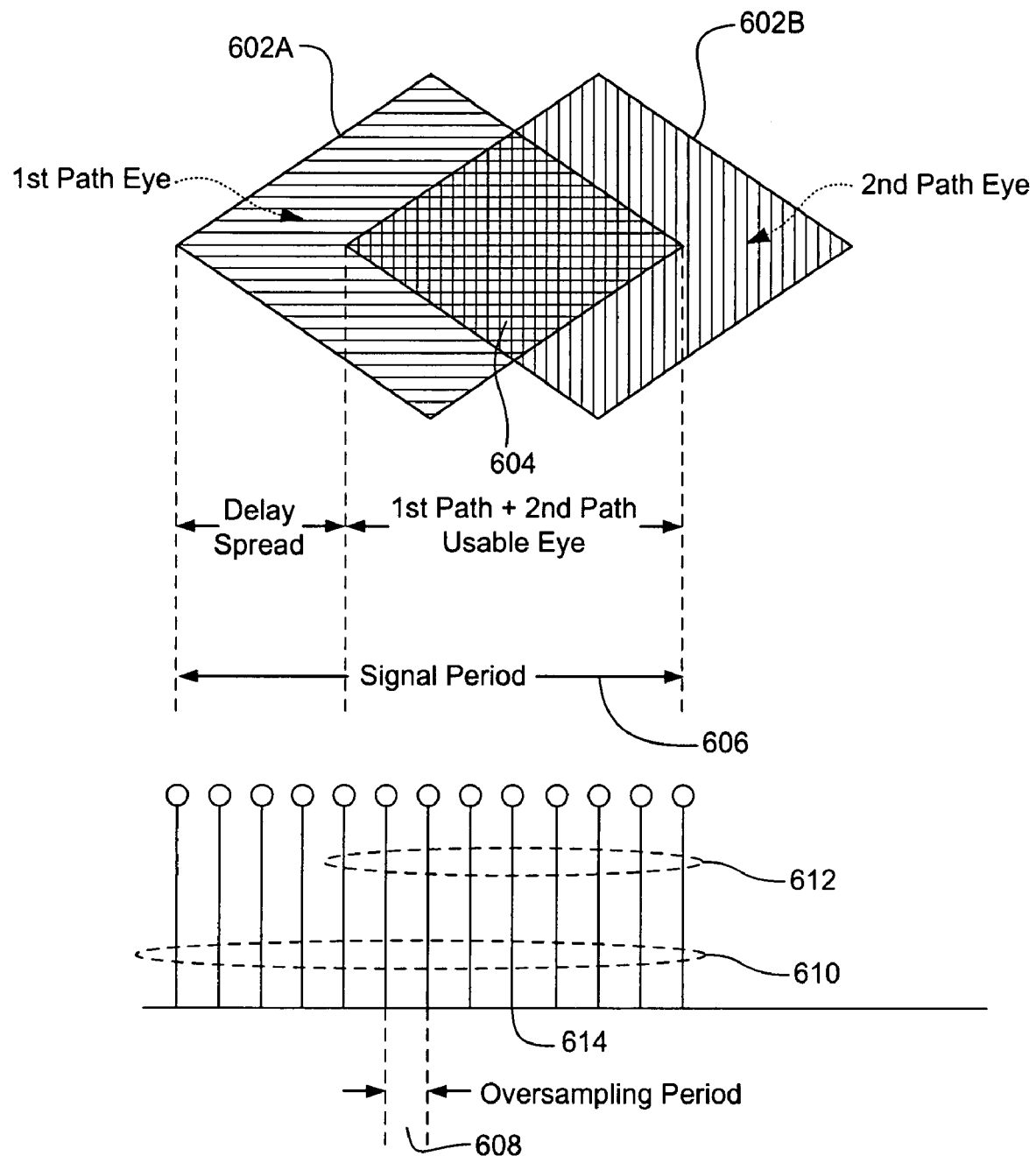
FIG. 6 is a time diagram illustrating the sampling of a signal effected by delay spread of the eye pattern according to another aspect of the invention.

FIG. 6 is a simplified time diagram showing the effect of delay spread on two versions 602A, 602B of the same signal received at different times over different paths (e.g., from different sites). The two signal versions 602A, 602B are transmitted and received on the same carrier frequency, so they may interfere with one another. By themselves, both versions 602A and 602B of the signal have large open eye patterns. However, when the two signal versions 602A and 602B partially overlap as a result of delay spread, the size of the resulting effective eye pattern 604 is reduced. Equipment adapted to receive the signals 602A, 602B may be capable of sampling an incoming signal a plurality of times during a signal period 606. The number of samples 610 taken during a signal period 606 may be expressed as the quotient of the signal period 606 divided by the oversampling period 608.

Not all samples 610 during the signal period 606 are the same—a subset 612 of the samples 610 may be taken during the time interval of the effective eye pattern 604. When the size of the usable eye pattern 604 increases as a function of time, the number of samples 612 in the effective eye pattern increases, and vice versa. One or more samples within the subset may be identified as the optimal sample or samples to use in determining the value of the symbol during the signal period 606. For example, as noted above, it may be desirable to select the sample that falls in the center of the effective eye pattern. For the signal pattern illustrated in FIG. 6, the ninth sample 614 may be selected because it falls roughly in the center of the effective eye pattern. In this case, the sample offset from the center of the symbol period would be +2, and the optimal sample point would be the ninth sample in the symbol period (for the oversampling rate of nine samples/period shown in FIG. 6).

A determination of the optimal sample point may be applied to subsequent signal periods. For example, if the ninth sample 614 within the signal period 606, is identified as the optimal sample point for the current symbol, the ninth sample within each subsequent symbol period may be utilized as the sample point for subsequent received symbols. The sample point also may be adjusted over time, for instance, to account for changes in the size or relative location of the effective eye pattern 604 within a symbol period 606. For example, the sample point may be determined by averaging the sample offset of the optimal samples over a number of symbol periods.

Figure 7A:
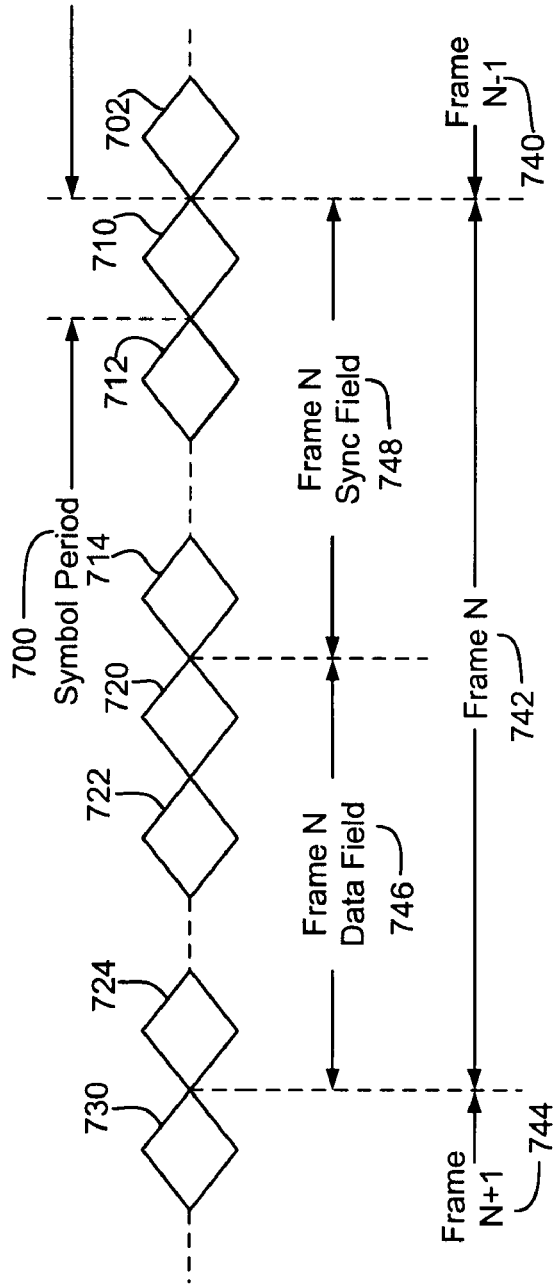
FIGS. 7A and 7B are time diagrams illustrating exemplary symbol data transmitted from the sites and received by the terminals according to another aspect of the invention.

FIG. 7A shows one exemplary format of data transmitted from the sites and received by the terminals. Symbols 702-730 may be transmitted at a periodic rate, with one symbol transmitted per symbol period 700. The symbol period 700 may also be referred to as the reciprocal of the symbol rate or the inverse of the baud rate. Symbols may be grouped into organizational units called frames 740-744. A frame 742 may comprise a plurality of symbols 710-724. A frame 742 may consist of the same number of symbols as the prior frame 740, or next frame 744, also known as a constant-length frame format. Alternatively, a frame 742 may consist of a different number of symbols from the prior frame 740, or the next frame 744, also known as variable-length frame format. A frame 742 may be further divided into a data field 746, comprising a plurality of symbols 720-724, and a sync field 748 comprising a plurality of symbols 710-714. While FIG. 7A describes a data transmission format wherein the symbols 710-714 associated with the sync field 748 are transmitted before the symbols 720-724 associated with the data field 746 of the frame 742, other transmission formats are possible.

Figure 7B:
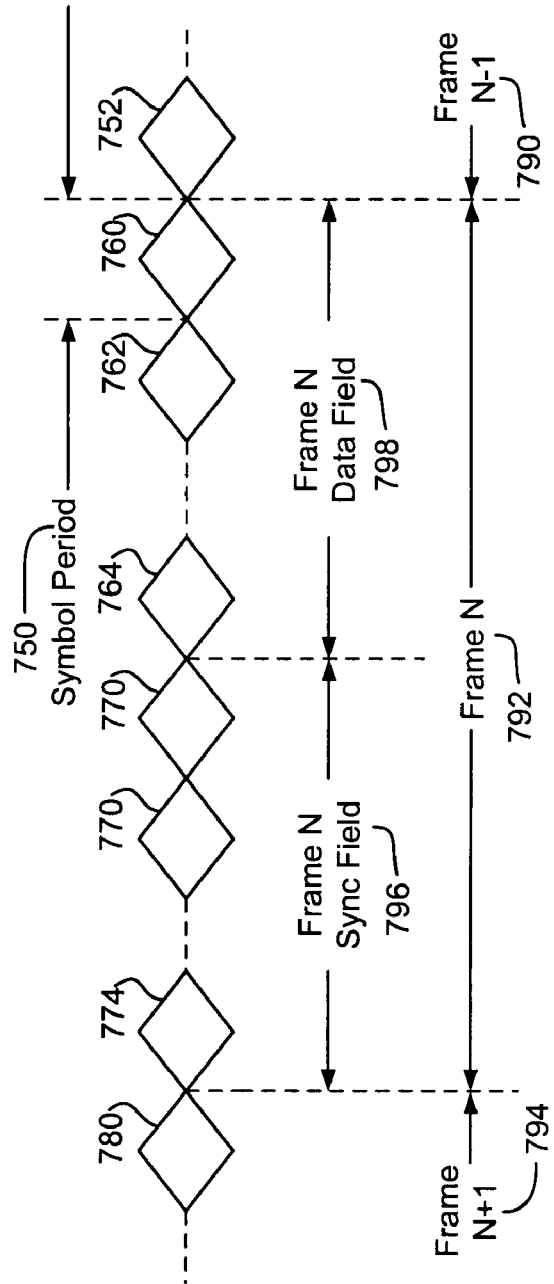

FIG. 7B shows another exemplary format of data transmitted from sites and received by terminals. Symbols 752-780 may be transmitted at a periodic rate, with one symbol transmitted per symbol period 750. The symbol period 750 may also be referred to as the reciprocal of the data or the inverse of the baud rate. Symbols may be grouped into organizational units called frames 790-794. A frame 792 may comprise a plurality of symbols 760, 762-764. A frame 792 may consist of the same number of symbols as the prior frame 790, or next frame 794, also known as a constant-length frame format, or a frame 792 may consist of the a different number of symbols as the prior frame 790, or next frame 794, also known as variable-length frame format. A frame 792 may be further divided into a sync field 796, comprising a plurality of symbols 780-784, and a data field 798 comprising a plurality of symbols 760-764.

Returning to FIG. 7A, a sync field 748 contains a plurality of symbols 710-714. One purpose of the sync field 748 is to allow the transmission of a known sequence or sequences of symbol values. A receiver of the data frames 740-744 may know the expected symbol values to be received in the sync field 748 of the frames 740-744. During sync maintenance, an expected time range gate is set up to look for the sync period symbols. A receiver of the data frames 740-744 may utilize the received symbol values of the symbols 710-714 transmitted in the sync field 748 for a variety of purposes. The primary purpose typically is synchronization of the incoming signal to determine an optimal sample point.

Figure 8A:
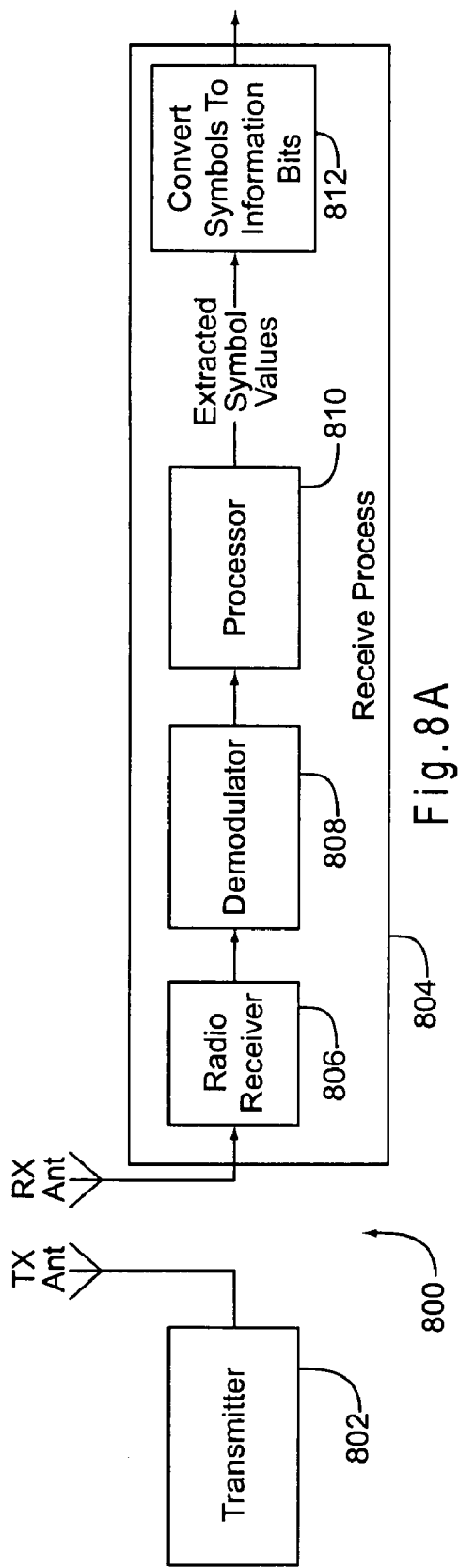
FIGS. 8A and 8B are functional block diagrams illustrating a system for selecting a sample point according to other aspects of the invention.
Figure 8B:
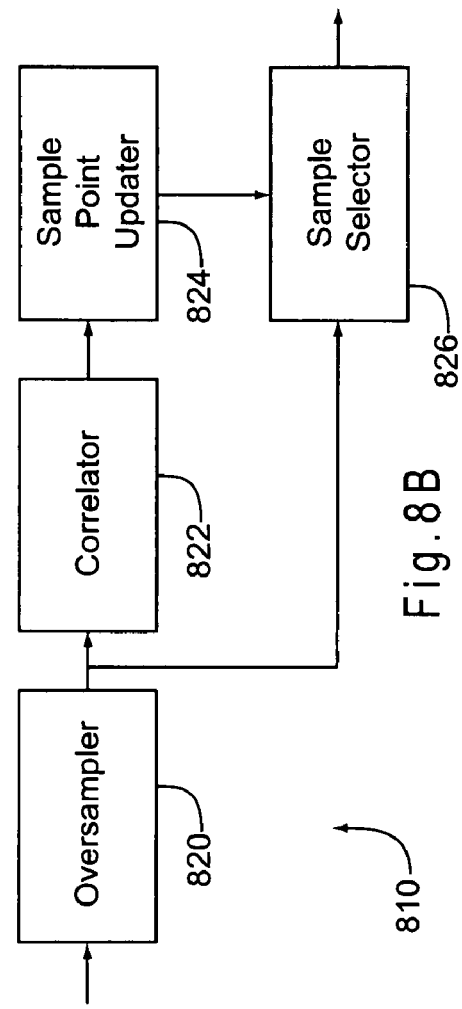

FIGS. 8A and 8B are functional block diagrams illustrating a system for selecting a sample point according to other aspects of the invention. As noted above, one way to ensure selection of an optimal sample within the symbol period is to select a sample at or near the center of the effective eye pattern. This maximizes the chance of selecting a sample that is representative of the transmitted symbol. The system illustrated in FIGS. 8A and 8B may be configured to select a sample point that converges toward the center of the effective eye pattern.

FIG. 8A includes a transmitter 802 and a receive process 804. For instance, the receive process 804 may be configured to operate in a handheld device, such as a portable two-way radio.

The receive process 804 is configured to receive a signal transmitted by the transmitter 802 using a radio receiver 806. A demodulator 808 demodulates the output from the radio receiver 806, and the output from the demodulator 808 is provided to a processor 810 for synchronization. For example, the processor 810 may be a time synchronization processor. The processor 810 is configured to oversample a portion of the received signal and to generate a series of signal samples. Processor 810 is further configured to determine an instantaneous sample point within a symbol period based on at least one of the signal samples. For example, the instantaneous signal sample point may be the optimal sample point for a particular data frame determined based on analysis of the synchronization field for that frame. To determine this instantaneous sample point, the processor may be programmed with software implementing the algorithms discussed below. The processor 810 also is configured to determine an updated composite symbol sample point. The processor may determine the updated composite symbol sample point based on the instantaneous sample point and a previous composite symbol sample point, or one or more previous instantaneous sample points, such that the updated symbol sample point converges toward the center of the effective eye pattern. For example, the processor may average the instantaneous sample point over time to determine a composite sample point, perhaps employing a weighted average. Because the composite symbol sample point is not based exclusively on the synchronization data for a single frame of the signal, it is less susceptible to momentary extremes in the delay spread condition.

FIG. 8B is a block diagram illustrating the processor 810 in more detail. The processor includes an oversampler 820 for performing the oversampling described above. The processor also includes a correlator, or correlation filter, 822. The correlator 822 may be configured to evaluate the samples of symbols in the sync field of an incoming data frame. The correlator may then determine the correlation between those samples and a predefined set of expected sync field values, producing an output value that indicates the correlation between the sampled and expected sync field values. In effect, the correlator 810 identifies the sample or samples that correlate most closely with the expected sample values. Based on this information, the sample point updater 824 determines an instantaneous sample point.

The sample point updater 824 is configured to determine an updated composite symbol sample point that converges toward the center of the incoming signal's effective eye pattern. The composite symbol sample point determined by the sample point updater 824 specifies the point within the symbol period representing the best place in the symbol period for extracting one sample representing the symbol value. The processor 810 includes a symbol selector 826 for selecting a desired sample within a symbol period based on input from the sample point updater 824.

All functions shown in FIG. 8*b* may be implemented using hardware, software, or a combination of both hardware and software. For example, the functions of the sample point updater 824 and the correlator 826 may be implemented as software programmed in a microprocessor, such as the processor 810 illustrated in FIG. 8A.

As noted above, in addition to determining an instantaneous sample point based on sync field data, a composite symbol sample point may be updated based at least in part on the sample point used in one or more previous symbol periods. For instance, an updated composite symbol sample point may be determined by averaging the instantaneous sample offset derived from the sync field data with one or more previous sample offsets. In other words, the next sample point may be a weighted average of the current composite sample point and an instantaneous sample point determined for the current frame or symbol by the sync field correlator and threshold and match detector, as described above.

One way to accomplish this is by generating a running average of the sample offset, which may be updated during each sync field to reflect the most recent delay spread. In this way, the composite sample offset tends to converge toward the center of the effective eye pattern of the signal, which improves the reliability of the selected sample data. For example, in a system having M symbols per frame and symbol period Ts, the sample offset may be determined using $A_{cs}(n)$=modulo $(A_a(n), T_s)$, where $A_a(n)$ is the averaged time delay as follows:

$$A_a(n)=(1-C)*A_a(n-1)+C*A_m(n) \text{ for } n>1; \text{ where}$$

$A_m(n)$ is the measured time delay of frame n referenced to a frame timing mark that is time-coincident with one symbol timing mark per frame;

$C=2^{-\alpha}$, where

α is an integration constant (i.e., the integration time constant increases and integration filter bandwidth decreases with increasing α).

$A_m(n)$ is measured from only the sync period symbols in a frame and averaged with $A_a(n-1)$ to form a new estimate of $A_a(n)$ that is used until the next sync period symbols arrive one frame later. For example, the next set of sync period samples will be received during the expected time range gate discussed above with reference to FIGS. 7A and 7B. For purposes of initializing synchronization, there will be no previous samples to use in the average, so the first calculated sample time offset $A_{cs}(1)$ is set equal to the first instantaneous sample point measurement, $A_m(1)$. Thereafter, the calculated sample time offset $A_{cs}(n)$ may be used for all symbols in frame n.

One advantage of averaging the sample offset over time is that if an instantaneous sample point is calculated from a sync field during an aberration of the effective eye pattern (such as due to a temporary shift caused by an obstruction and reflection of the transmitted signal), the aberrant sample point will have a reduced effect on the actual composite sample point used to sample the remainder of the data frame. If the aberrant sample point were used as the next sample point, without incorporating any prior sample point information, the aberrant sample point may be outside of the effective eye pattern once the aberration ends, thus resulting in samples that may not be resolved into correct symbol values, which may increase the bit error rate.

As an alternative to averaging, a composite symbol sample point may be determined or updated using other methods. For instance, a composite symbol sample point may be determined using a median of instantaneous sample points.

Figure 9:
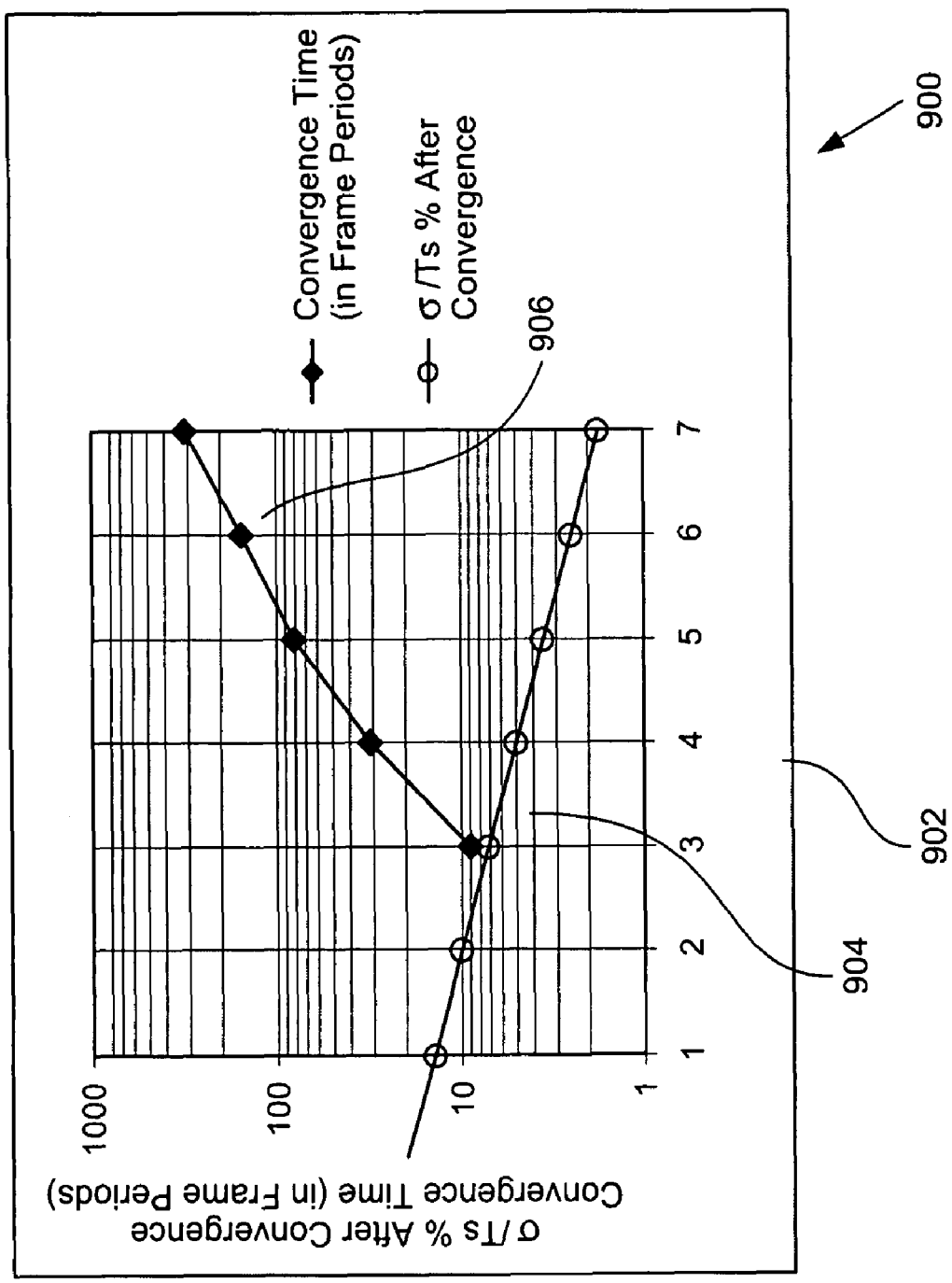
FIG. 9 is a data plot illustrating the effect of the averaging constant on convergence time and standard deviation of converged sample point according to another aspect of the invention.

FIG. 9 is a data plot illustrating the effect of the averaging constant on convergence time and standard deviation of converged sample point according to another aspect of the invention. The x-axis 902 of plot 900 shows the update factor C in terms of α (with $C=1/2^\alpha$, so C decreases with increasing α). The plot 900 includes two data curves 904, 906, both illustrated as functions of α. The upper curve 906 shows the number of received frames before convergence is within 5% of the optimum sample point for an 800 MHz faded signal with 160-microsecond delay spread at 100 km/hr velocity. This curve 906 effectively shows convergence time in frame periods and demonstrates that selecting a smaller C will result in a longer time for the system to converge to a sample point within the effective eye pattern that meets the threshold requirement.

The lower curve 904 represents the standard deviation σ of the calculated sample point (as a percentage of the symbol period $T_s$) once the signal has converged. This curve 904 shows that selecting a smaller C will result in a smaller standard deviation in the selected sample point once convergence has been achieved. The maximum acceptable $\sigma/T_s$ percentage is dependent on the modulation and expected maximum delay spread to be encountered. Thus, a faster convergence to the optimal sample point comes at the expense of a higher σ/Ts percentage.

As previously discussed, the effective eye pattern may shift, expand or contract due to factors including but not limited to signal jitter, movement of the terminal, and reflections or obstructions of the transmitted signal. A change in the effective eye pattern may result in a different instantaneous sample point. According to some aspects of the invention, the instantaneous sample point is used to calculate a new composite sample point. Therefore, the determination of a composite sample point may be repeated to account for possible changes in the effective eye pattern. The rate of repetition of this determination and calculation may be selected based on a variety of factors, such as the computational intensiveness of the algorithms utilized to determine a new sample offset.

In some cases, the composite symbol sample point may fall between two consecutive samples of the signal. In this case, according to another aspect of the invention, the receiver of an input signal may adjust the phase relationship of the oversampling clock to sample the input signal at the calculated composite sample point. Alternatively, if the desired composite sample point is between two existing sample points, the sample value recovered may be an interpolated value based on the sample values of the two existing sample points. For example, if the calculated sample value is halfway between existing sample point N and existing sample point N+1, the interpolated sample value may be determined as a linear average of the values of sample point N and sample point N+1. If desired, even higher order interpolation techniques can be used. According to another aspect of the invention, a variable delay filter may be used for the interpolation. For example, the interpolation may be accomplished using simple IIR filter, such as:

$$H(z) = \{a + z^{-1}\} / \{1 + az^{-1}\}.$$

Delays of fractions of the oversample clock rate may be accomplished by adjusting the constant a. In most cases, the phase of this filter will be sufficiently linear to not cause significant groupmmm delay distortion of the signal.

Figure 10:
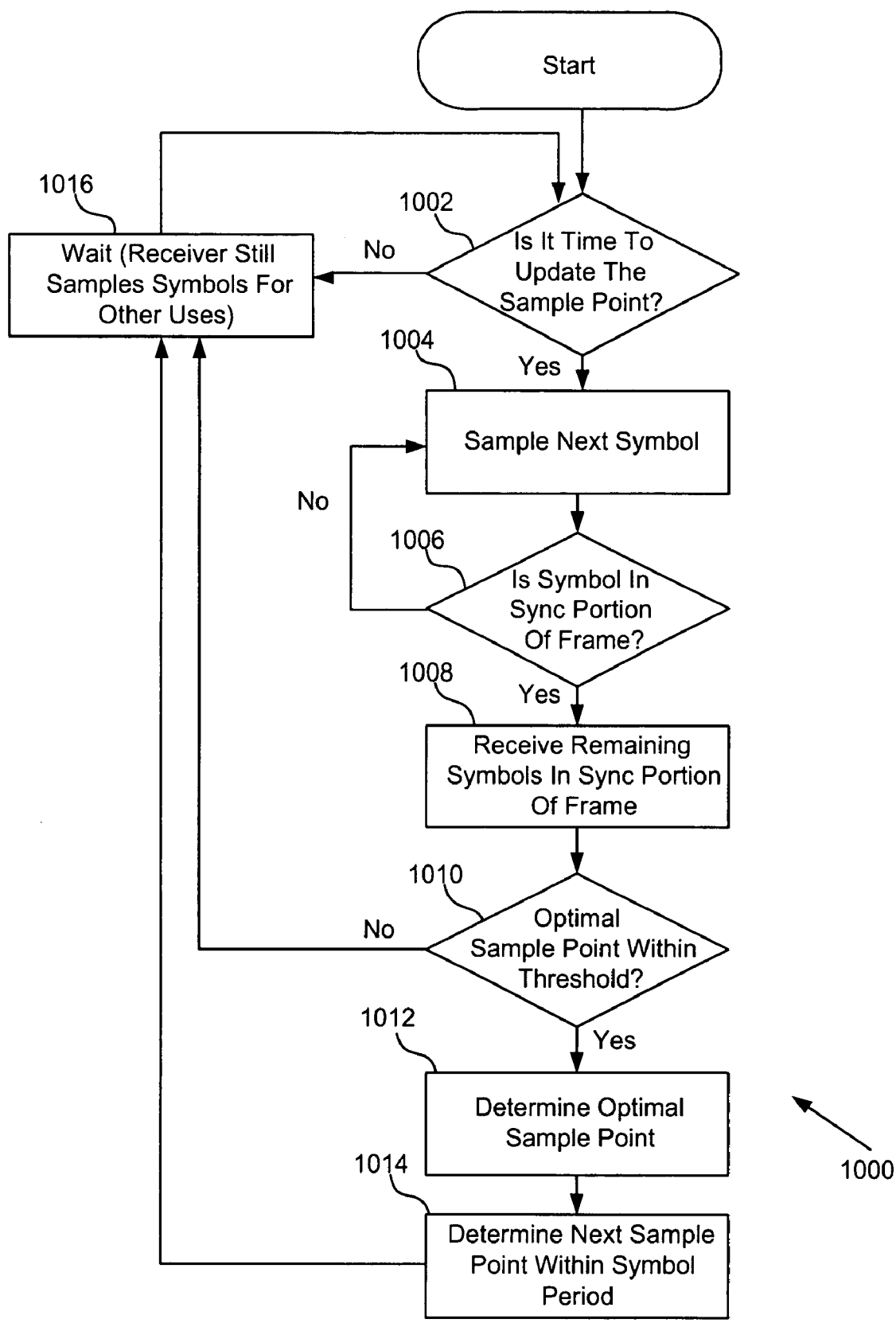
FIG. 10 is a flow diagram illustrating a method of determining an updated sample point for receiving a digital signal according to another aspect of the invention.

FIG. 10 is a flow diagram illustrating a method of determining an updated composite sample point for receiving a digital signal according to another aspect of the invention. The algorithm checks 1002 to determine if the composite sample point should be updated. For example, a new composite sample point may be determined once per frame of received data. Alternatively, a new composite sample point may be determined less frequently, such as once per two or more frames. When a terminal begins reception of a new signal, a receiver may immediately determine an initial sample point, then update the sample point at a defined interval (e.g., once per frame or once every N frames). If it is not time to update the sample point, then the receiver continues 1016 to acquire one or more symbols using the existing sample point. Control then returns to check 1002 once again whether the sample point should be updated. If it is time to update the sample point, control passes to step 1004.

If it is determined that the composite sample point should be updated, then the algorithm samples 1004 the next symbol. For example, the next symbol may be oversampled D times per symbol period. The algorithm then determines 1006 whether this symbol is in the sync portion of the frame. For example, this determination may be based on the current symbol, or on multiple symbols. If the current symbol is not in the sync portion of the frame, the algorithm returns and samples 1004 the next symbol period. If the current symbol is in the sync portion of the frame, the algorithm samples 1008 the remaining symbols in the sync field. For example, the remaining symbols in the sync field may be oversampled D times per symbol period.

Next, the algorithm determines 1010, 1012 the instantaneous sample point. Although this process is illustrated as two separate steps in FIG. 10, determination of the instantaneous sample point may be integrated as a single procedure. For example, the optimal sample point may be determined by comparing the sync field symbol data values taken at sample N of each symbol period with expected sync field symbol data. This comparison may be repeated D times, where D is the number of times the symbol data was sampled per symbol period. Alternatively, this comparison may be performed by utilizing a correlation filter implemented in hardware or software. The comparison results are then compared 1010 to a threshold criterion, which represents the maximum acceptable difference between actual and expected data. If the comparison results for one or more of the samples satisfies the threshold criterion (e.g., the correlation match is greater than the correlation threshold), then the corresponding samples are considered to represent potential new sample points within the symbol period. The sample index for one of these samples may then be selected 1012 as the instantaneous sample point for the current sync field. For example, if only one sample satisfies the threshold criterion, then the index for that sample may be selected as the instantaneous sample point. If more than one sample satisfies the threshold criterion, then the algorithm may select the index of one of the samples as the instantaneous sample point, for example, by averaging the indices of the samples that satisfy the threshold criterion.

It is possible that none of the samples in a sync field will satisfy the threshold criterion. For example, the received data may be corrupted because of problems with signal transmission or reception. This may occur if obstructions block the reception of incoming data from one or more, or possibly all, simulcast sites. Updating the sample point in this case may lead to a worse result (increased bit error rate) than skipping the update and continuing to use the existing sample point. Therefore, if none of the samples in the current symbol period satisfy the threshold criterion, then it may be desirable to select no instantaneous sample point for the current sync field. In this case, the existing composite sample point is not updated during this cycle of the algorithm, and the algorithm returns to wait 1016 for the next opportunity to update the sample point.

If an instantaneous sample point for the current sync field was selected 1012, then the selected instantaneous sample point is used to determine 1014 an updated composite sample point. For example, if there is no existing composite sample point, then the instantaneous sample point may be used as the new composite sample point. This situation may occur, for example, during the first cycle of the algorithm.

If there is an existing composite sample point, then an updated composite sample point may be calculated using the following equation: new_composite_sample_point=(instantaneous sample point*$C_0$)+(current_composite_sample_point*(1−$C_0$)). The value of current_composite_sample_point may then be updated to equal the newly calculated value of new_composite_sample_point for the next cycle. Update factor $C_0$ is provided for use by the algorithm and may be used to control the weighting of the instantaneous sample point from the current sync field in the calculation of the updated composite sample point.

Alternatively, an updated composite sample point may be calculated using the equation: new_composite_sample_point=(instantaneous_sample_point*$C_0$)+(prior_instantaneous_sample_point(1)*$C_1$)+(prior_instantaneous_sample_point(2)*$C_2$)+ . . . +(prior_instantaneous_sample_point(m−1)*$C_{m-1}$). In this equation, $C_0+C_1+C_2+ \ldots +C_{m-1}=1$, and prior_instantaneous_sample_point[n−1:1] is a set of the last n−1 instantaneous sample points, updated once per cycle with the instantaneous sample point for a particular prior sync field. Coefficients $C_0, C_1, C_2, \ldots, C_{m-1}$ are provided for use by the algorithm and, like $C_0$ discussed above, may be used to control the weighting of the optimal sample points from the current and prior sync fields in the calculation of the next sample point.

The value of new_composite_sample_point may be rounded or truncated to an existing oversample point. For example, if the calculated new composite sample point falls between samples 7 and 8 of 16 samples of a symbol taken by the oversampling hardware, the new composite sample point may be rounded or truncated to sample 7 or 8.

As described above, the method illustrated in FIG. 10 may be used to calculate a new or updated composite sample point for use in sampling future symbols. The updated composite sample point may be used to sample symbols as soon as it is determined. Alternatively, the existing composite sample point may be used for one or more symbol periods before the updated composite sample point is used. In certain situations, it may be desirable not to use the updated composite sample point at all.

Each of the functional blocks illustrated in FIG. 10 may require one or more symbol periods to complete. For example, it may require more than one symbol period to perform the threshold comparison 1010, the instantaneous sample point determination 1012, or to the next composite sample point determination 1014. To increase the efficiency of these operations, the functional blocks illustrated in FIG. 10 may operate in parallel with other data sampling operations using the existing sample point to sample symbols for use by other hardware or software in the receiver. In other words, the composite sample point update procedure may be configured such that it does not interfere with other real-time requirements of the receiver to sample incoming symbol data for other uses.

According to another aspect of the invention, a communication system may consist of one or more transmitters and one or more receivers. The transmitters may be adapted to transmit symbol data comprising frames organized into data fields and sync fields, for example, organized as described in FIG. 7A or FIG. 7B. The sync field data to be transmitted and received may be known to both the transmitter and the receiver. In another aspect of the invention, a receiver may be adapted to receive symbol data from one or more transmitters. The receiver may sample the symbol data using an existing composite sample point. The receiver may be adapted to calculate a new composite sample point. The calculation of the new composite sample point may utilize the received sync field data and known or expected sync field data to calculate a new composite sample point.

The methods and systems of the present invention may be realized in software, hardware, or a combination of software and hardware. For example, a typical combination of software and hardware may be a digital signal processor (DSP) with a program that controls the DSP to perform the methods described herein. Any type of computing system or other apparatus adapted for realizing the methods described herein is suitable. In the present context, a program may include any expression, in any language, code or notation, of a set of instructions intended to cause a system having an information processing capability to perform a particular function.

It is intended that the foregoing detailed description be regarded as illustrative rather than limiting, and that it be understood that the following claims, including all equivalents, are intended to define the scope of this invention. Although various aspects of the invention have been described in the context of P25-compatible systems, one of ordinary skill in the art will recognize that the invention may be applied to other types of simulcast communication systems to reduce bit error rates resulting from delay spread. In addition, the invention may be applied to non-simulcast communication systems to reduce bit error rates resulting from delay-spread multipath fading. In addition, variations on the methods and systems described herein may be made within the scope of the invention for detection or calculation of an optimal sample point with or without the use of a sync data field, as will be apparent to those reasonably skilled in the art.

The invention claimed is:

1. A method for processing a signal with an effective eye pattern, said method comprising:
    receiving said signal comprising at least one data frame including a data field formed of a plurality of data symbols and a sync field formed of a plurality of sync symbols having known symbol values;
    oversampling at least a portion of said plurality of sync symbols to generate a plurality of signal samples;
    determining an instantaneous sample point within a symbol period based on at least one of the signal samples; and
    determining an updated composite symbol sample point based on a previous composite symbol sample point and the instantaneous sample point, such that the updated composite symbol sample point converges toward the center of the effective eye pattern.

2. The method of claim 1 further comprising sampling the signal for at least one symbol period utilizing the updated composite symbol sample point.

3. A method for processing a signal with an effective eye pattern, said method comprising:
    oversampling a portion of the signal to generate a plurality of signal samples;
    determining an instantaneous sample point within a symbol period based on at least one of the signal samples; and
    determining an updated composite symbol sample point based on a previous composite symbol sample point and the instantaneous sample point, such that the updated composite symbol sample point converges toward the center of the effective eye pattern;
    wherein: the signal is divided into a plurality of frames; each of the signal frames includes at least one symbol period of the signal; each of the signal frames includes a synchronization field; and the plurality of signal samples are sampled from one of the synchronization fields.

4. The method of claim 1, wherein the instantaneous sample point within the symbol period is determined using a correlation filter.

5. A method for processing a signal with an effective eye pattern, said method comprising:
    oversampling a portion of the signal to generate a plurality of signal samples;
    determining an instantaneous sample point within a symbol period based on at least one of the signal samples; and
    determining an updated composite symbol sample point based on a previous composite symbol sample point and the instantaneous sample point, such that the updated composite symbol sample point converges toward the center of the effective eye pattern;
    wherein the updated composite symbol sample point is determined based on an average of the previous composite symbol sample point and the instantaneous sample point.

6. A method for processing a signal with an effective eye pattern, said method comprising:
    oversampling a portion of the signal to generate a plurality of signal samples;
    determining an instantaneous sample point within a symbol period based on at least one of the signal samples; and determining an updated composite symbol sample point based on a previous composite symbol sample point and the instantaneous sample point, such that the updated composite symbol sample point converges toward the center of the effective eye pattern;

wherein the updated composite symbol sample point is selected using an average of the instantaneous sample point and a plurality of previous instantaneous sample points determined during previous signal frames.

7. The method of claim 6, wherein the average is a weighted average.

8. A system for processing a signal having an effective eye pattern, comprising:
a receiver configured to receive the signal comprising at least one data frame including a data field formed of a plurality of data symbols and a sync field formed of a plurality of sync symbols having known symbol values; and
a processor configured to oversample at least a portion of the plurality of sync symbols to generate a plurality of signal samples, to determine an instantaneous sample point within a symbol period based on at least one of the plurality of signal samples, and to determine an updated composite symbol sample point based on a previous composite symbol sample point and the instantaneous sample point, such that the updated symbol sample point converges toward the center of the effective eye pattern.

9. A system for processing a signal having an effective eye pattern, comprising:
a receiver configured to receive the signal; and
a processor configured to oversample a portion of the received signal to generate a plurality of signal samples, to determine an instantaneous sample point within a symbol period based on at least one of the plurality of signal samples, and to determine an updated composite symbol sample point based on a previous composite symbol sample point and the instantaneous sample point, such that the updated symbol sample point converges toward the center of the effective eye pattern;
wherein: the signal includes a plurality of frames; each of the signal frames includes at least one symbol period of the signal; each of the signal frames includes a synchronization field; and the plurality of signal samples are sampled from at least one of the synchronization fields.

10. The system of claim 8, wherein the processor further comprises a correlator.

11. The system of claim 8, wherein the processor is further configured to determine the updated composite symbol sample point based on an average of the previous composite symbol sample point and the instantaneous sample point.

12. A system for processing a signal having an effective eye pattern, comprising:
a receiver configured to receive the signal; and
a processor configured to oversample a portion of the received signal to generate a plurality of signal samples, to determine an instantaneous sample point within a symbol period based on at least one of the plurality of signal samples, and to determine an updated composite symbol sample point based on a previous composite symbol sample point and the instantaneous sample point, such that the updated symbol sample point converges toward the center of the effective eye pattern;
wherein the processor is further configured to determine the updated composite symbol sample point based on an average of the instantaneous symbol sample point and a plurality of previous instantaneous sample points determined during previous signal frames.

13. The system of claim 12, wherein the average is a weighted average.

14. A system for processing a signal having an effective eye pattern, comprising:
a transmitter configured to transmit a signal containing at least one data frame including a data field formed of a plurality of data symbols and a synchronization field formed of a plurality of sync symbols with known values;
a receiver configured to receive the signal using a current composite symbol sample point;
an oversampler configured to oversampling one or more of the plurality sync symbols to generate signal samples; and
a sample point updater communicatively coupled to the oversampler and configured to determine an updated composite symbol sample point based at least in part on the signal samples generated by the oversampler, such that the updated composite symbol sample point converges toward the center of the effective eye pattern.

15. The system of claim 14, further comprising a correlator in communication with the sample point updater.

16. A system for processing a signal having an effective eye pattern, comprising:
a transmitter configured to transmit a signal containing synchronization field data, wherein the synchronization field data includes a plurality of symbols with known values;
a receiver configured to receive the signal using a current composite symbol sample point; and
a sample point updater configured to determine an updated composite symbol sample point based at least in part on the synchronization field data, such that the updated composite symbol sample point converges toward the center of the effective eye pattern;
wherein the receiver is further configured to determine an instantaneous symbol sample point based on the synchronization field data and to determine the updated composite symbol sample point based on an average of the instantaneous symbol sample point and the current composite symbol sample point.

17. A system for processing a signal having an effective eye pattern, comprising:
a transmitter configured to transmit a signal containing synchronization field data, wherein the synchronization field data includes a plurality of symbols with known values;
a receiver configured to receive the signal using a current composite symbol sample point; and
a sample point updater configured to determine an updated composite symbol sample point based at least in part on the synchronization field data, such that the updated composite symbol sample point converges toward the center of the effective eye pattern;
wherein the processor is further configured to determine an instantaneous symbol sample point based on the synchronization field data and to determine the updated composite symbol sample point based on an average of the instantaneous symbol sample point and a plurality of previous instantaneous symbol sample points determined during previous signal frames.

18. The system of claim 17, wherein the average is a weighted average.

* * * * *